Nov. 28, 1961 G. E. KELLOGG ET AL 3,010,772
BRAKE PEDAL RETURN
Filed Nov. 25, 1959 2 Sheets-Sheet 2
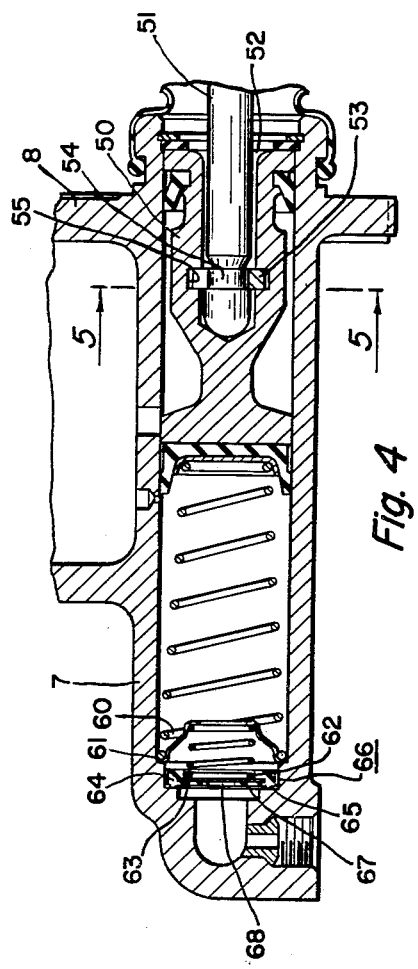
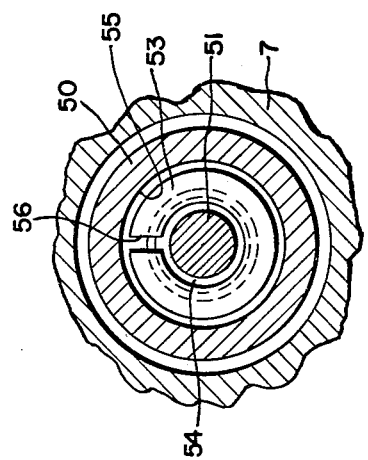
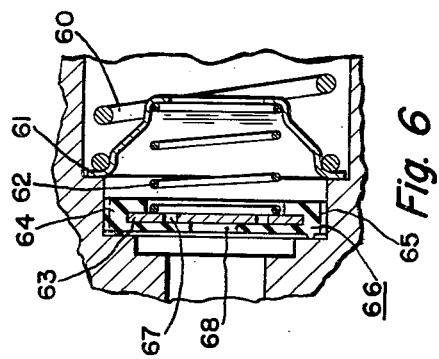
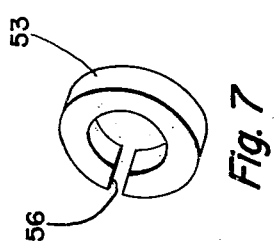
INVENTORs.
George E. Kellogg
Charles R. Kenrick
BY
Their Attorney

United States Patent Office 3,010,772
Patented Nov. 28, 1961

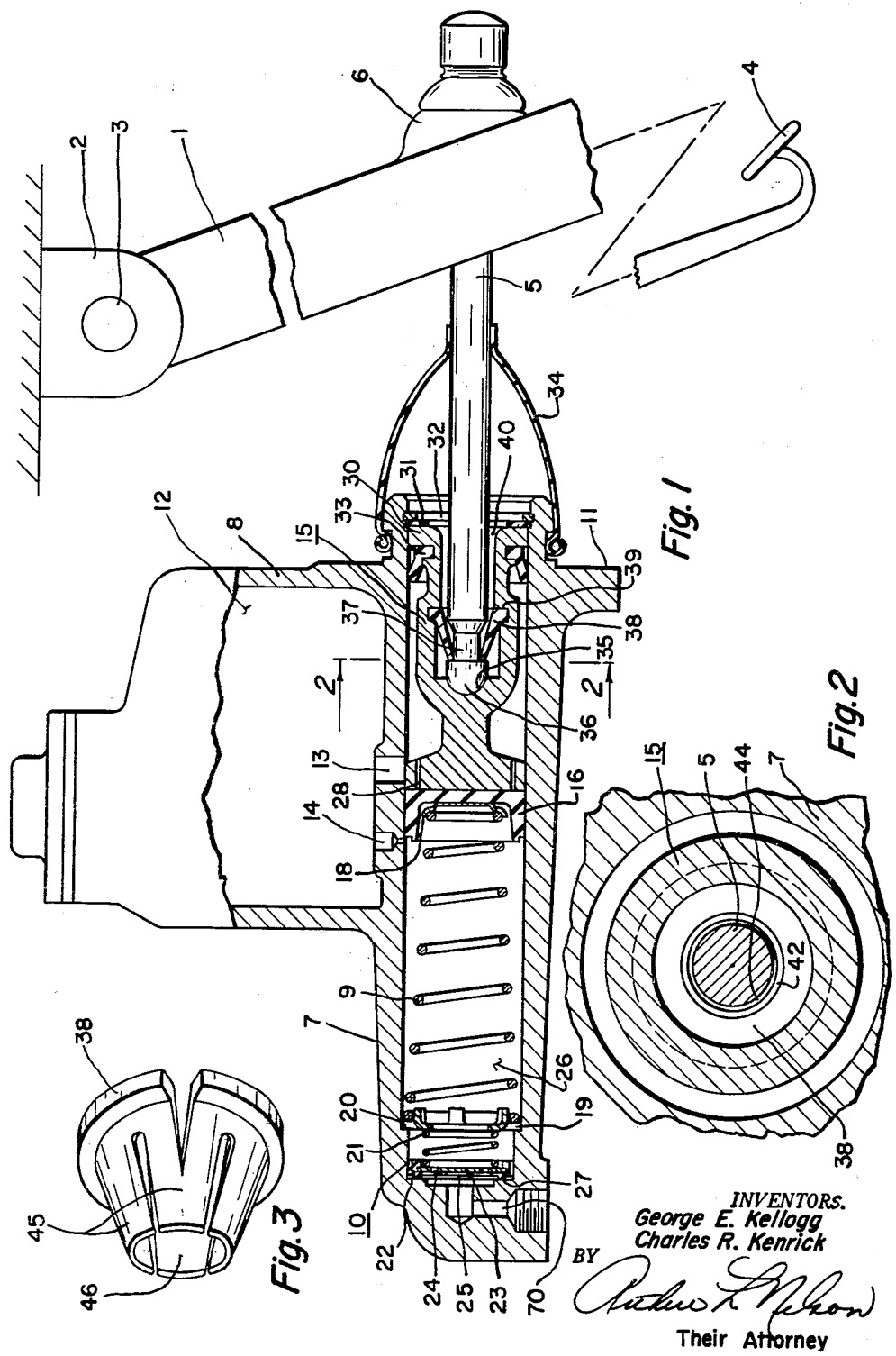

3,010,772
BRAKE PEDAL RETURN
George E. Kellogg, Miamisburg, and Charles R. Kenrick, Bellbrook, Ohio, assignors to General Motors Corporation, Detroit, Mich., a corporation of Delaware
Filed Nov. 25, 1959, Ser. No. 855,308
4 Claims. (Cl. 309—20)

This invention relates to a motor vehicle brake and more particularly to a push rod retainer and pedal return means.

In the conventional vehicle brake pedal the return spring is placed on the brake pedal to return the pedal to a normally retracted position. A spring is also employed within the master cylinder to return the master piston to its normally retracted position. The return spring for the master piston in the conventional master cylinder also operates against the check valve in the forward end of the master cylinder. The spring force on the check valve depends upon the position of the master piston within the master cylinder.

Accordingly, this invention is intended to provide a spring for operation on the check valve under a constant force. A single return spring is also employed to return the master piston and the brake pedal to their normally retracted positions. To prevent disengagement of the push rod with the master piston a retainer means is employed within the master piston to seat the push rod in a fixed position relative to the master piston.

It is an object of this invention to provide a push rod retained within the master piston by means of a radially extendable element which permanently seats the push rod within the master piston.

It is another object of this invention to provide a master piston and brake pedal return means as a single element within the master cylinder.

It is a further object of this invention to provide a return means for the master piston and the brake pedal operating against the forward side of the master piston. In combination with the single return spring within the master cylinder a second spring is employed to provide a constant force for operating the check valve.

The objects of this invention are accomplished by employing a brake pedal pivotally connected to the push rod. The push rod extends into the rearward end of the master piston which operates within a master cylinder. The push rod is retained within the master piston by a radially expandable element such as a snap ring for permanently seating the push rod within the master piston. The forward end of the master piston operates against a spring to provide a return means for the master piston and the brake pedal. In combination with the return spring a second spring is employed to operate the check valve in the forward end of the master cylinder. This provides the constant operating pressure within the fluid lines of the brake fluid system. It also provides a single spring to return the master piston and the brake pedal.

Further objects and advantages of the present invention will be apparent from the following description, reference being had to the accompanying drawings wherein preferred embodiments of the present invention are clearly shown.

In the drawings:

FIGURE 1 is a cross section view of the braking means including the master cylinder and master piston and showing the check valve in the forward end of the master cylinder.

FIGURE 2 is a cross section view taken along line 2—2 of FIGURE 1.

FIGURE 3 is a three dimensional view of a modified retainer for the push rod within the master piston.

FIGURE 4 is a cross section view of a modified version employing a snap ring on the forward end of the push rod.

FIGURE 5 is a cross section view taken on line 5—5 of FIGURE 4.

FIGURE 6 is an enlarged cross section view of the check valve as illustrated in FIGURE 4.

FIGURE 7 is a three dimensional view of the snap ring illustrated in FIGURE 4.

The device as illustrated in FIGURE 1 employs a single return spring for the master piston operating within the master cylinder and for the brake pedal. A retainer is also employed on the forward end of the push rod within the master piston for preventing the push rod from dislocating from its position within the master piston.

The brake pedal 1 is pivotally mounted on the supporting bracket 2 by means of a pin 3. The brake pedal 1 is of the pendant type which extends downwardly and is provided with a foot pad 4. The brake pedal 1 is pivotally connected to the push rod 5 by means of a pivoting connection 6. The pivoting connection 6 is illustrated in a copending application of Kellogg et al., of the same assignee, Serial No. 855,307, and filed November 25, 1959.

The master cylinder 7 is formed integral in the casting with the reservoir 8. The master cylinder 7 is of the conventional type except for the forward end which has provisions for the return spring 9 and the check valve assembly 10. The master cylinder 7 has a flange 11 adapted for mounting on the firewall of the motor vehicle.

The reservoir chamber 12 is in communication with the central opening within the master cylinder by the ports 13 and 14.

The master piston 15 operates within the central opening in the master cylinder 7. The master piston has a seal 16 on its forward end and is maintained on its position in the forward end of the master piston 15 by the spring 9. The spring 9 is mounted on the spring seat 18 on the forward end of the seal 16.

The forward end of the spring 9 is mounted on the spring retainer 19 which seats on a shoulder 20 within the master cylinder 7. The seat 19 also provides a means on its forward side for compressively holding the spring 21. The spring 21 operates the check valve assembly 10.

The check valve assembly 10 consists of a rubber retainer 22 receiving the disk 23. The disk 23 has a plurality of holes 24 angularly spaced on a radial circle. The retainer 22 has a central opening 25.

The fluid within the chamber 26 of the master cylinder 7 is forced through the openings 24 displacing the central portion of the retainer 22. The fluid is then permitted to pass forwardly through the central opening 25 of the retainer 22 to the plurality of wheel cylinders for operation of the vehicle brakes.

The return of fluid passes about the outer periphery of the retainer 22 by unseating the annular bead structure 27 of the retainer 22 from the forward end of the master cylinder.

A check valve is also provided on the forward end of the master piston 15. This check valve includes the plurality of passages 28 on the forward end of the master piston 15. By forward movement of the master piston the fluid firmly seats the seal 16 on the forward end of the master piston 15. On return movement of the master piston 15 fluid is permitted to pass through the plurality of passages 28 thereby unseating the seal 16, and passing around the outer periphery of the seal 16 into the chamber 26.

The master piston 15 is provided with the seating flange 30. The seating flange 30 operates against a snubber or bumping plate 31 which is mounted adjacent the snap ring 32. The snap ring 32 provides the stop means for the rearward movement of the master piston 15. The seating flange 30 with an annular groove on the master piston 15 provide the means for seating the rear seal 33.

The push rod 5 extends into an opening from the rearward end of the master piston 15. A boot 34 seals on the outer periphery of the push rod 5 and the outer periphery of the master cylinder 7. This boot is flexible to permit movement of the push rod 5 relative to the master cylinder 7.

The push rod abuts a spherical socket 35 in the master piston 15. The socket 35 receives the spherical head 36 of the push rod 5. An annular recess 37 is provided just rearward of the spherical head 36. The recess 37 receives the forward end of the retainer 38. The retainer 38 is also seated within an annular recess 39 on the outer periphery of the central opening 40 in the rear end of the master piston 15.

The push rod 5 is forced forwardly within the opening 40 of the master piston 15. As the push rod moves forward it slips by the forward end of the retainer 38. The retainer 38 then drops into the recess 37 and retains the push rod 5 in fixed relation to the master piston 15. The push rod and piston are permanently fixed relative to each other. However, the push rod may be disassembled from the piston by inserting a sleeve about the outer periphery of the push rod 5 and thereby expanding the forward end of the retainer 38. In this manner the push rod 5 may then be retracted from the piston 15.

FIGURE 2 is a cross section taken on line 2—2 of FIGURE 1. FIGURE 2 is an enlarged section more clearly showing the relative positions of the push rod 5 in the piston 15. The piston 15 receives the push rod 5. The forward end 42 of the retainer 38 is seated within the recess 37 on the push rod 5. The retainer 38 as illustrated in FIGURE 2 is intended to be constructed of a material having sufficient resilience to permit the expansion of the forward end 42 and permit forward movement of the push rod within the opening 44. As the push rod head 36 moves forwardly within the opening 44 the forward end 42 of the retainer 38 snaps into position permanently retaining the push rod 5 relative to the piston 15. The rearward end of the retainer 38 seats within the annular recess 39 of the master piston 15.

FIGURE 3 illustrates a three dimensional view of a similar retainer. The retainer however has a plurality of resilient fingers 45 which expand when the head 36 of the push rod 5 is inserted within the opening 46. The fingers 45 seat within the annular recess 37 and permanently retain the push rod relative to the piston 15. The retainer as illustrated may be constructed of a resilient material such as polyethylene, nylon, or even a metal retainer of this structure would work satisfactorily.

Referring to FIGURE 4, the master cylinder 7 and the reservoir 8 are of the same general structure. The master cylinder 7 accommodates a piston 50 operating within the master cylinder. The push rod 51 is forced within the opening 52 within the piston 50. A snap ring 53 is received within the annular recess 54 of the push rod 51. As the push rod is moved forwardly within the opeinng 52 the snap ring 53 aligns with the annular groove 55 of the piston 50. As the snap ring moves into the groove 55 it expands radially locking the push rod 51 relative to the piston 50. In this manner the push rod and piston are in fixed relative position for operation within the master cylinder 7.

Referring to FIGURE 7, the snap ring 53 is shown in three dimensional view. The snap ring is expanded to its locking position as it is held within the master piston 50. The groove 55 is of larger diameter than the snap ring 53 as shown in the groove. The larger diameter is provided to permit radial expansion of the snap ring 53 by means of insertion of a wedge within the slit 56. As the wedge is inserted within the slit 56 the snap ring 53 is expanded and the push rod 51 is permitted to be removed from its assembled position in the master piston 50.

FIGURE 5 is a cross section view which is enlarged to illustrate the relative positions of the push rod and the snap ring within the master piston 50. The snap ring 53 may be constructed of any resilient material having good wearing qualities required for the position in which the snap ring is employed.

FIGURE 6 is a cross section and enlarged view of the check valve as shown in FIGURE 4. The piston and pedal return springs 60 seat on the outer portion of the hat-shaped spring retainer 61. The spring retainer 61 also receives the valve spring 62 within the hollow portion of the hat-shaped spring retainer 61. The valve spring 62 also seats on the metal disk 63. The metal disk 63 is mounted within the resilient member 64. Resilient member 64 is an annular member having a plurality of extending buttons 65 on its outer periphery to permit return flow of the fluid when the valve assembly 66 is unseated. The disk 63 is provided with a plurality of angularly spaced openings 67 on a common radial circle. A concentric opening 68 is provided in the resilient member 64. The operation of this valve is similar to that of the valve assembly 10. The difference of the two illustrations being in the hat-shaped spring retainer 61 in comparison to the retainer 20 as illustrated in FIGURE 1.

The pedal return means operates in the following described manner. As the pedal 1 is depressed it pivots about the pin 3 and the push rod 5 also pivots relative to the pedal 1. This movement moves the push rod 5 forward within the master cylinder 7. The forward movement of the push rod 5 carries the master piston 15 forwardly within the master cylinder 7. The forward movement of the master piston 15 moves the seal 16 beyond the port 14 to pressurize fluid in the chamber 26. The forward movement of the piston 15 compresses the return spring 9.

The check valve assembly 10 maintains a residual pressure within the fluid brake actuating system which includes port 70. When the pressure within the chamber 26 builds up to a greater degree than that within the port 70 the check valve opens. This opening is accomplished by means of pressure within the opening 24 which deflects the central portion of the resilient retainer 22. The fluid passes through the port 24 and then passes radially inward within the check valve assembly and exhausts through the central opening 25 in the check valve assembly. As the fluid passes through the check valve assembly the plurality of wheel cylinders of the vehicle brakes are then operated. The wheel cylinders are not shown in this view but are conventional and not a necessary part of this invention.

Subsequent to actuation of the vehicle brakes the pedal 1 is then released. Upon release of the pedal 1 the return spring 9 moves the master piston 15 rearwardly carrying the master piston 15 and the pedal 1. With a decrease in the pressure within the chamber 26 the fluid within the port 70 returns through the check valve assembly 10. The return of fluid through the check valve assembly unseats the annular bead 27 of the check valve assembly 10 which is mounted on the facing of the forward wall of the master cylinder 7. The unseating of the check valve assembly permits the fluid to pass around the annular ridge 27 and also around the outer periphery of the check valve. This operation in turn reduces the fluid pressure within the port 70. The fluid passing around the check valve 10 passes into the chamber 26. Further return of the master piston 15 opens the port 14. This in turn permits the pressure within the chamber 26 to return to the atmospheric pressure present in the chamber 12 of the reservoir 8.

In this manner the check valve has a constant operating pressure depending upon the spring 21. Only a slight deflection of the check valve assembly 10 is required to unseat the ridge 27 from the radial face on the forward end of the master cylinder 7. The check valve assembly is operated by a compression spring 21 of constant length. This in turn requires a constant pressure within the port to unseat the check valve and permit the return of fluid to the chamber 26.

A single return spring 9 is provided to return the master piston 15 and the pedal 1. As the pedal 1 is released the return spring 9 returns the piston 15 to its normally retracted position against the buffer 31 which seats on the snap ring 32. In the return position, if the push rod 5 were not fastened relative to the master piston 15 the push rod would disassemble from the piston 15. In the disclosure as shown, however, the retainer 38 maintains the relative position of the push rod 5 relative to the master piston 15. This locking action of the retainer 38 permits the use of a single spring 9 for the master piston and the pedal 1.

The retainer 38 as shown is an annular member being flexible enough to permit the insertion of the head 36 within the opening in the forward end of the retainer 38. The retainer 38, however, is rigid enough to maintain the axial position of the rod 38 relative to the piston 15. Once the push rod 5 is inserted within the retainer 38 it is permanently seated so the push rod contacts the spherical surface 35.

A modification is illustrated in FIGURE 3 wherein a more rigid member may be employed. The retainer 45 is provided with a plurality of flexible fingers extending forwardly to receive the push rod 5. In this manner a metal member could be employed to operate as the retainer for the push rod in the piston 15.

The snap ring as illustrated in FIGURE 7 is also another modification of the same general type of the structure. This device however is more simple and also provides a positive lock of the rod 51 within the piston 50.

The structure as shown provides a simple manner in which the pedal 1 and the piston 15 may be returned to the normally retracted position without danger of disassembling the push rod from within the piston. This type of structure eliminates the need for a retraction spring on the brake pedal. The device not only provides a simple means for locking the push rod 5 and the master piston 15 in a relative axial position but it also provides a simple manner in which the two may be disengaged in event repair is needed.

While the embodiments of the invention as herein disclosed constitute preferred forms, it is to be understood that other forms might be adopted.

What is claimed is as follows:

1. A piston and rod connection comprising in combination, a push rod, a piston operated by said push rod, an opening formed in said piston, an annular recess formed in said opening of said piston, an expandable element, an annular ridge formed on said expandable element received in said recess in said piston, forwardly extending fingers formed on said expendable element, a central perforation on the forward end of said expandable element receiving said push rod, a plurality of slits adjoining said perforation on the forward end of said element forming said fingers, an annular recess on said push rod receiving of said plurality of fingers to maintain a fixed axial position between said push rod and said piston.

2. A piston and rod connection comprising in combination, a push rod adapted for operation by manual means, a head portion on the forward end of said push rod, an annular recess adjacent to said head portion on said push rod, a piston, a central opening extending forwardly from the rearward end of said piston, an annular recess in the intermediate portion of said opening in said piston, a retainer element, a peripheral bead formed on the rearward end of said retainer element, a slot extending forwardly from the rearward end of said retainer through said annular bead on said retainer element, a cone-shaped portion on the forward end of said retainer element, a plurality of fingers in said cone-shaped portion received within said annular recess in said push rod, said peripheral bead on said retainer element received within said annular recess of said piston thereby providing fixed axial position between said push rod and said piston.

3. A piston and push rod assembly comprising in combination, a push rod, a head portion formed on the forward end of said push rod, an annular recess formed on said push rod adjacent to said head portion of said push rod, a piston, a central opening extending forwardly from the rearward end of said piston, an annular recess in said central opening, a retainer element formed of a resilient material, an annular ridge formed on said retainer element received within said annular recess in said piston, a plurality of fingers extending forwardly and radially inward from said annular ridge received within said annular recess in said push rod thereby maintaining a fixed axial position between said push rod and said piston.

4. A piston and rod connection comprising in combination, a push rod, a head portion formed on said push rod, an annular recess adjacent said head portion on said push rod, a piston, a central opening extending forwardly from the rearward end of said piston, an annular recess in said opening of said piston, a retainer element of a plastic material, an annular ridge portion on said retainer element received within said annular recess of said piston, a slit through said ridge to permit radial contraction of said ridge, a plurality of radially contractable fingers extending forwardly from said ridge received within said annular recess of push rod thereby maintaining a fixed axial position between said push rod and said piston.

References Cited in the file of this patent

UNITED STATES PATENTS

| | | |
|---|---|---|
| 1,452,932 | Pritchard | Apr. 24, 1923 |
| 1,488,796 | Parsons | Apr. 1, 1924 |
| 2,124,762 | Carroll | July 26, 1938 |
| 2,166,724 | Loweke | July 18, 1939 |
| 2,242,096 | Thomas | May 13, 1941 |
| 2,380,607 | Nystrom | July 31, 1945 |
| 2,451,216 | Halfvarson | Oct. 12, 1948 |
| 2,452,247 | Larsh | Oct. 26, 1948 |
| 2,546,045 | Scheldorf | Mar. 20, 1951 |
| 2,856,250 | Thoma | Oct. 14, 1958 |

FOREIGN PATENTS

| | | |
|---|---|---|
| 434,957 | Germany | Oct. 4, 1926 |
| 977,439 | France | Nov. 8, 1950 |